(12) United States Patent
Gonzalez et al.

(10) Patent No.: US 12,378,991 B2
(45) Date of Patent: Aug. 5, 2025

(54) CONTAINED BEARING ASSEMBLIES AND RELATED SYSTEMS AND METHODS

(71) Applicant: US Synthetic Corporation, Orem, UT (US)

(72) Inventors: Jair J. Gonzalez, Provo, UT (US); Jair A. Gonzalez, Provo, UT (US); Tyler Kolste, American Fork, UT (US); Daryl Wise, Provo, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 190 days.

(21) Appl. No.: 18/231,674

(22) Filed: Aug. 8, 2023

(65) Prior Publication Data

US 2024/0052886 A1   Feb. 15, 2024

Related U.S. Application Data

(63) Continuation-in-part of application No. 18/226,731, filed on Jul. 26, 2023, and a continuation-in-part of application No. 17/884,501, filed on Aug. 9, 2022.

(51) Int. Cl.
| | |
|---|---|
| *F16C 17/10* | (2006.01) |
| *F16C 17/26* | (2006.01) |
| *F16C 33/04* | (2006.01) |

(52) U.S. Cl.
CPC ............ *F16C 17/10* (2013.01); *F16C 17/26* (2013.01); *F16C 33/043* (2013.01); *F16C 2320/16* (2013.01)

(58) Field of Classification Search
CPC ...... F16C 17/10; F16C 17/105; F16C 17/107; F16C 17/26; F16C 33/043; F16C 2320/16
See application file for complete search history.

(56) References Cited

U.S. PATENT DOCUMENTS

| | | |
|---|---|---|
| 3,478,523 A | 11/1969 | Reusser et al. |
| 3,887,248 A | 6/1975 | Riegler |
| 4,029,368 A | 6/1977 | Tschirky et al. |
| 4,080,014 A | 3/1978 | Riegler et al. |
| 4,141,605 A | 2/1979 | Riordan et al. |
| 4,190,301 A | 2/1980 | Lachonius et al. |
| 4,410,054 A | 10/1983 | Nagel et al. |
| 4,560,014 A | 12/1985 | Geczy |
| 4,720,199 A | 1/1988 | Geczy et al. |
| 4,738,322 A | 4/1988 | Hall et al. |
| 4,756,631 A | 7/1988 | Jones |
| 4,828,403 A * | 5/1989 | Schwartzman ....... F16C 27/063 384/100 |

(Continued)

FOREIGN PATENT DOCUMENTS

| | | |
|---|---|---|
| EP | 0595630 A1 | 5/1994 |
| RU | 2044176 | 9/1995 |

(Continued)

OTHER PUBLICATIONS

International Search Report for PCT/US2023/029772, Oct. 24, 2023, 4 pages.
Written Opinion for PCT/US2023/029772, Oct. 24, 2023, 10 pages.

*Primary Examiner* — Phillip A Johnson
(74) *Attorney, Agent, or Firm* — BKRIP LLC

(57) ABSTRACT

Bearing assemblies, apparatuses, systems, and methods include bearing assemblies with bearing elements that are at least partially contained in the bearing assembly.

20 Claims, 13 Drawing Sheets

(56) References Cited

U.S. PATENT DOCUMENTS

| | | | |
|---|---|---|---|
| 4,914,865 A | 4/1990 | Wiand et al. | |
| 5,267,398 A | 12/1993 | Hall | |
| 7,552,782 B1 | 6/2009 | Sexton et al. | |
| 7,866,418 B2 | 1/2011 | Bertagnolli et al. | |
| 7,870,913 B1 | 1/2011 | Sexton et al. | |
| 7,901,137 B1 | 3/2011 | Peterson | |
| 7,934,776 B2 | 5/2011 | de Andrade et al. | |
| 8,210,747 B2 | 7/2012 | Cooley et al. | |
| 8,312,631 B2 | 11/2012 | Sexton | |
| 8,613,554 B2 | 12/2013 | Tessier et al. | |
| 8,678,657 B1 | 3/2014 | Knuteson | |
| 8,708,564 B2 | 4/2014 | Cooley et al. | |
| 8,814,434 B1 | 8/2014 | Sexton | |
| 9,127,708 B2 * | 9/2015 | Gonzalez | F16C 17/107 |
| 9,322,433 B1 | 4/2016 | Peterson | |
| 9,562,562 B2 | 2/2017 | Paterson | |
| 9,611,885 B1 | 4/2017 | Cooley | |
| 10,113,362 B2 * | 10/2018 | Ritchie | E21B 7/067 |
| D888,788 S | 6/2020 | Kolste | |
| 11,009,071 B2 | 5/2021 | Kolste | |
| 11,054,000 B2 | 7/2021 | Prevost et al. | |
| 2007/0046119 A1 | 3/2007 | Cooley | |
| 2009/0008892 A1 | 1/2009 | Gaumer | |
| 2010/0226759 A1 | 9/2010 | Cooley et al. | |
| 2010/0237621 A1 | 9/2010 | Tessier | |
| 2010/0288558 A1 | 11/2010 | Sexton | |
| 2011/0024198 A1 | 2/2011 | Dick et al. | |
| 2011/0192648 A1 | 8/2011 | Baudoin | |
| 2012/0039551 A1 | 2/2012 | Cooley | |
| 2012/0057814 A1 | 3/2012 | Dadson | |
| 2012/0281938 A1 | 11/2012 | Peterson et al. | |
| 2012/0321232 A1 | 12/2012 | Cooley | |
| 2012/0325560 A1 | 12/2012 | Sexton | |
| 2013/0004106 A1 | 1/2013 | Wenzel | |
| 2013/0170778 A1 | 7/2013 | Higginbotham et al. | |
| 2015/0043849 A1 | 2/2015 | Peterson | |
| 2017/0146060 A1 * | 5/2017 | Cooley | F16C 33/04 |
| 2019/0136628 A1 | 5/2019 | Savage | |
| 2021/0222734 A1 | 7/2021 | Gonzalez | |
| 2022/0145933 A1 | 5/2022 | Prevost | |

FOREIGN PATENT DOCUMENTS

| | | |
|---|---|---|
| RU | 107299 | 8/2011 |
| WO | 2015184022 | 12/2015 |
| WO | 2016172577 | 10/2016 |
| WO | WO2020028189 A1 | 2/2020 |
| WO | 2020131421 | 6/2020 |
| WO | 2021046335 A1 | 3/2021 |

* cited by examiner

CONTAINED BEARING ASSEMBLIES AND RELATED SYSTEMS AND METHODS

CROSS REFERENCE TO RELATED APPLICATIONS

This application is a continuation in part of U.S. patent application Ser. No. 18/226,731 titled "BEARING ASSEMBLIES CONFIGURED TO ACCOMMODATE AXIAL MOVEMENT AND RELATED SYSTEMS AND METHODS," filed Jul. 26, 2023, and U.S. patent application Ser. No. 17/884,501, titled "FORCE COUPLING ASSEMBLIES AND RELATED SYSTEMS AND METHODS," filed Aug. 9, 2022, the disclosure of each which is incorporated herein in its entirety by reference.

TECHNICAL FIELD

This application relates to bearing assemblies and related systems and methods.

BACKGROUND

Bearing assemblies are commonly used in a variety of mechanical applications to facilitate a controlled motion of a component (e.g., rotation of a component). For example, mixers, agitators, chemical reactors, subterranean drilling systems, turbomachinery, hydroelectric plants, turbine generators, pumps, and additional machinery may utilize bearing assemblies.

Certain equipment may involve rotating members that experience significant axial forces and/or movement. Such rotating members may experience axial movement for various reasons, such as mechanical forces, expansion of components, and/or contraction of components.

Mechanical systems including one or more bearings may include one or more radial and/or thrust bearing apparatuses for carrying loads generated during operation where the bearings are operably coupled to at a motor or other device that supplies a force to through the bearing apparatuses to another connected component. Bearing apparatuses utilized in such mechanical systems may each include a stator that does not rotate and a rotor that is surrounded by the stator and that is attached to the output shaft to rotate with the output shaft.

In some instances, the stator and rotor may each include a plurality of superhard bearing elements or inserts. For example, wear-resistant, superhard materials may be utilized for bearing elements utilized in bearing assemblies. A polycrystalline diamond compact (PDC) bearing assembly may include steel rotor and stator bearing rings that are each configured to accept a number of superhard bearing elements. Each superhard bearing element may include a polycrystalline diamond (PCD) layer formed on a substrate, such as a cemented tungsten carbide substrate. One or more superhard bearing elements may be attached to a bearing rotor or stator by press-fitting, brazing, or through other suitable methods of attachment. Typically, bearing elements attached to a bearing rotor have superhard bearing surfaces configured and oriented radially outward to bear against opposing superhard bearing surfaces of bearing elements attached to a bearing stator that radially surrounds the bearing rotor.

During operation, an output shaft that transfers rotational torque from a motor may be deflected at various angles relative to the rotational axis of a bearing apparatus. Over time, such repeated deflection of the output shaft may cause a bearing rotor attached to the output shaft to become axially misaligned with respect to a bearing stator surrounding the bearing rotor. Axial misalignment of the bearing rotor from the bearing stator may result in a decrease in bearing performance or bearing failure.

SUMMARY

In some aspects, the techniques described herein relate to a bearing assembly, including: an inner assembly including an inner support ring positioned about an inner ring axis; an outer assembly including an outer support ring positioned about an outer ring axis; superhard contact elements coupled to the inner support ring and the outer support ring having superhard contact surfaces, the inner assembly configured to move relative to the outer assembly when a rotational force is applied to the bearing assembly; and one or more thrust bearing elements including a hardened surface configured to at least partially contain the inner assembly relative to the outer assembly, the one or more thrust bearing elements positioned and configured to support the bearing assembly when an axial loading is applied between the inner assembly and the outer assembly in a direction at least partially along at least one of the inner ring axis or the outer ring axis.

In some aspects, the techniques described herein relate to a bearing assembly, including: a first assembly including a first support ring positioned about a first ring axis; a second assembly including a second support ring positioned about a second ring axis; superhard contact elements coupled to the first support ring and the second support ring, superhard contact surfaces of the superhard contact elements configured to rotated relative to each other when a rotational force is applied to the bearing assembly; and one or more thrust bearing elements configured to contain the first assembly at least partially within the second assembly, the one or more thrust bearing elements positioned and configured to support the first assembly in response to a thrust force applied between the first assembly and the second assembly in a direction at least partially along at least one of the first ring axis or the second ring axis.

In some aspects, the techniques described herein relate to a method of providing a bearing assembly between components of a rotating system, the method including: rotating a shaft about an axis of rotation; supporting the rotating shaft with a first ring of the bearing assembly coupled to the shaft and a second ring of the bearing assembly coupled to another component, the first ring and the second ring each having one or more superhard coupling elements coupled thereto; and at least partially containing the first ring within the second ring with one or more thrust bearing elements.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

DETAILED DESCRIPTION

Figure 1:
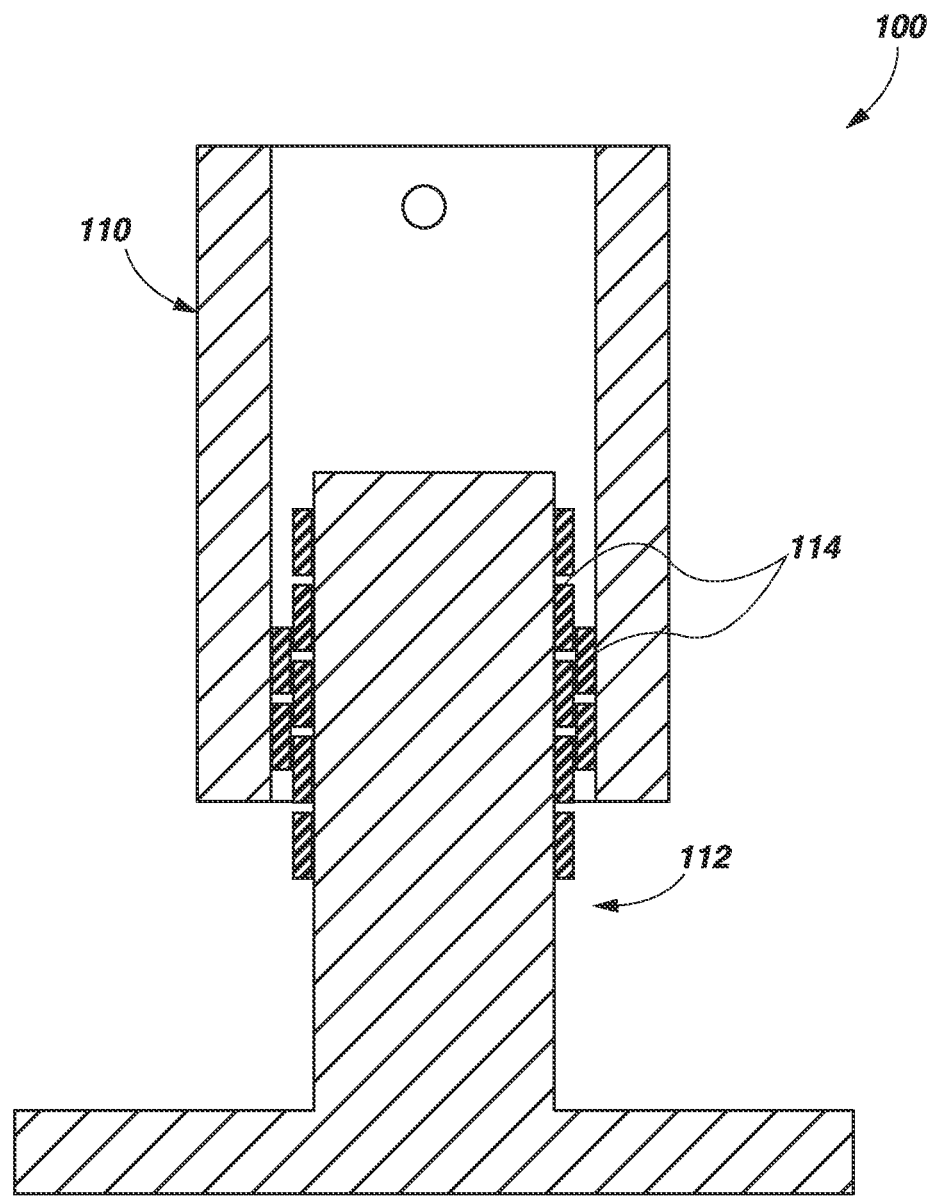
FIG. 1 is a cross-sectional side view of a bearing assembly.

The terms "superabrasive" and "superhard," as used herein, may refer to any material having a hardness that is at least equal to a hardness of tungsten carbide. For example, a superhard article may represent an article of manufacture, at least a portion of which may exhibit a hardness that is equal to or greater than the hardness of tungsten carbide.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical," "lateral," "axial," and "radial" refer to the orientations as depicted in the figures.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

Embodiments of the instant disclosure are directed to exemplary bearing assemblies including superhard bearing elements and related systems and methods. Such bearing assemblies may be contained such that the bearing elements of bearing assembly are at least partially prevented from at least one direction of movement (e.g., translation, axial translation, etc.) relative to each other. For example, the bearing elements of bearing assembly may be at least partially contained in an axial direction (e.g., by one or more thrust bearing elements or features).

Such bearing assemblies may be used in a variety of applications, including mixers, agitators, reactors, machinery, pumps, subterranean drilling systems, turbomachinery, hydroelectric plants, windmills, cranes, turbine generators, and power plant machinery and any other suitable applications, without limitation.

In some embodiments, the bearing assemblies may enable handling of multiple loads (e.g., both radial and axial loads) in one relatively small assembly. The bearing assembly may be tailored for the amount of loading that is expected in each direction (e.g., thrust loads directions, both radial load directions, and variations therebetween, etc.). In some embodiments, the bearing elements may be substantially self-contained enabling for a simplified design (e.g., with one portion at least partially enclosing another portion while the portions are movable relative to each other).

In some embodiments, the bearing assemblies may be attached as a unit (e.g., bolted, pinned, keyed, and/or splines) within a larger assembly. In applications having relatively larger temperature differences, the bearing assembly may handle thrust loads over a relatively small distance enabling initial clearances to be maintained. In some embodiments, the bearing assembly may be preloaded.

In some embodiments, such contained bearing assemblies may exhibit one or more degrees of freedom that enable the contained bearing assembly (e.g., a whole of bearing assembly) to move during use to accommodate one or more operational conditions. For example, the bearing assemblies may enable translational movement along an axis (e.g., an axis of rotation) such that, while the individual bearing elements may be contained to move axially together, the individual bearing elements may be move collectively together in an axial direction. However, as discussed below, in additional embodiments, the contained bearing assemblies may be in a fixed position during operation.

A bearing assembly 100 as shown in FIG. 1 may be used to at least partially accommodate for axial movement. As depicted, the bearing assembly 100 includes an outer bearing 110 and an inner bearing 112 each including multiple rows of polycrystalline diamond compacts 114 (PDCs) that provide a bearing surface. The multiple rows of PDCs 114 extending axially along the inner bearing 112 and the outer bearing 110 allow the outer bearing 110 to slide axially up and down relative to the inner bearing 112 while maintaining contact between at least some of the PDCs 114 of the outer bearing 110 with some of the PDCs 114 of the inner bearing 112.

This bearing assembly 100 configuration, however, requires that a relatively large bearing surface area include PDCs 114, thus a relatively large number of PDCs are required. Due to the effort and expense required to manufacture PDCs, a bearing assembly that accommodates such axial movement with fewer PDCs would be desirable.

Some embodiments of the present disclosure may include a bearing assembly that is enabled to move in one or more degrees of freedom (e.g., a translation degree of freedom in an axial direction). For example, as discussed below, the bearing assembly may be combined with a coupler (e.g., positioned at least partially within or about a sleeve) that enables the bearing assembly to move (e.g., translate) along the sleeve.

Figure 2A:
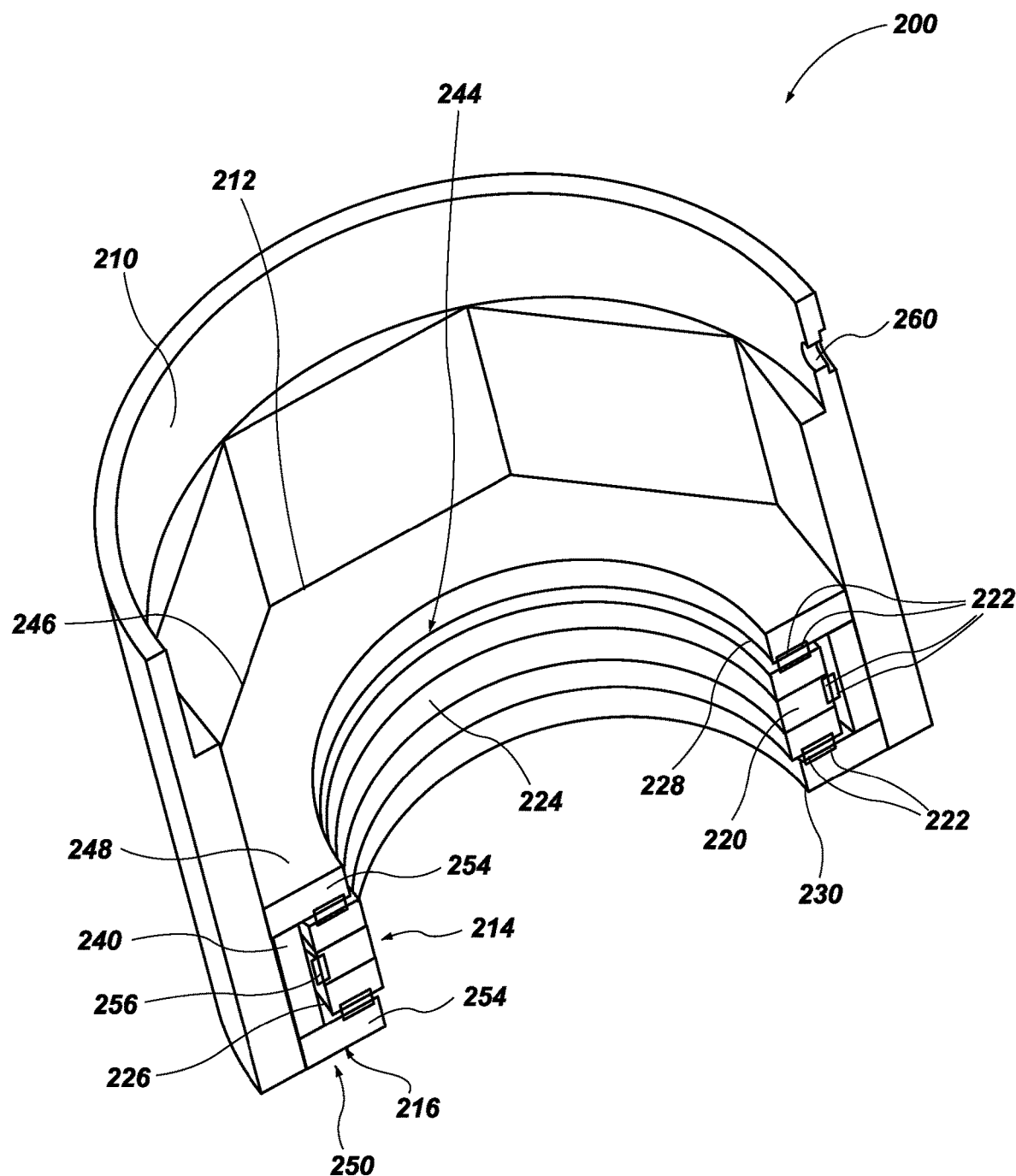
FIG. 2A is a cross-sectional isometric view of a bearing assembly having a coupler with a mating feature comprising an axially extending interface with a polygonal-shaped lateral cross section according to an embodiment of the present disclosure.

FIG. 2A is a cross-sectional isometric view of a bearing assembly 200 having a coupler 210 (e.g., sleeve) with at least one mating feature 212 that at least partially resists movement (e.g., rotation) between the bearing assembly 200 and the coupler 210. For example, the mating feature 212 may comprise an axially extending interface with a polygonal-shaped lateral cross section according to an embodiment of the present disclosure. The bearing assembly 200 includes a first bearing ring 214, a second bearing ring 216, and the coupler 210.

The first bearing ring 214 may comprise an annular first support structure 220 having one or more bearing elements 222 (e.g., superhard bearing elements) extending therefrom. The support structure 220 may comprise an inner aperture 224, an outer circumference 226, a first end 228, and an opposing second end 230.

A row of superhard bearing elements 222 (e.g., PDCs) may be located on the outer circumference 226 of the first support structure 220 of the first bearing ring 214 to provide a bearing surface configured to bear lateral loading (e.g., radial loading perpendicular to an intended axis of rotation). In some embodiments, a single row of superhard bearing elements 222 may be located on the outer circumference 226 of the first support structure 220 of the first bearing ring 214 to provide a bearing surface configured to bear lateral loading. In additional embodiments, multiple rows of superhard bearing elements 222 may be implemented.

In some embodiments, the first end 228 of the first support structure 220 of the first bearing ring 214 may include a hardened surface, such as a superhard surface provided by a plurality of superhard bearing elements 222, and the opposing second end 230 of the first support structure 220 of the first bearing ring 214 may include a hardened surface, such as a superhard surface provided by a plurality of superhard bearing elements 222, which may provide bearing surfaces for axial forces that may act on each end of the first bearing ring 214.

In some embodiments, the first support structure 220 of the first bearing ring 214 may comprise multiple sections that may be connected to form the first support structure 220. In further embodiments, the first support structure 220 may be a monolithic structure.

Similar to the first bearing ring 214, the second bearing ring 216 may comprise an annular second support structure 240 having one or more bearing elements 222 (e.g., superhard bearing elements) extending therefrom. The second support structure 240 may comprise an inner aperture 244, an outer circumference 246, a first end 248, and an opposing second end 250. The second bearing ring 216 may be sized and configured so that the first bearing ring 214 is positioned radially within (e.g., contained within) the second bearing ring 216 in a nested configuration. Accordingly, the first bearing ring 214 and the second bearing ring 216 may each be arranged circumferentially around an intended axis of rotation 252 (see FIG. 2B) about which the first bearing ring 214 and the second bearing ring 216 may rotate relative to one another.

In some embodiments, the second bearing ring 216 may enclose the first bearing ring 214 such that the first bearing ring 214 is substantially fixed (e.g., contained) within the second bearing ring 216 while being able to rotate within the second bearing ring 216 with only minor axial and/or radial translational movement. As noted above, while the contained bearing assembly 200 is shown with an axial movement feature, in additional embodiments, the contained bearing assembly 200 may lack such features (e.g., may be substantially axially fixed).

For example, the second support structure 240 of the second bearing ring 216 may additionally include laterally extending members 254 at the first end 248 and the second end 250 that may extend over a portion of the first end 228 and the second end 230 of the first bearing ring 214, respectively, and restrict the axial movement of the first bearing ring 214 relative to the second bearing ring 216. Accordingly, the second support structure 240 of the second bearing ring 216 may be formed in multiple sections that may be assembled and joined together, such as by welding, brazing, bonding, and/or fasteners, after the first bearing ring 214 is positioned radially within a central portion of the second bearing ring 216.

A row of superhard bearing elements 222 may extend from an inner circumference 256 of the second support structure 240 of the second bearing ring 216 positioned to contact the superhard bearing elements 222 of the first bearing ring 214 and to provide a bearing surface configured to bear lateral loading (e.g., radial loading perpendicular to an intended axis of rotation).

In some embodiments, a single row of superhard bearing elements 222 may extend from the inner circumference 256 of the second support structure 240 of the second bearing ring 216 to provide a bearing surface configured to bear lateral loading.

In some embodiments, the laterally extending member 254 at the first end 248 of the second support structure 240 of the second bearing ring 216 may include a hardened surface, such as, for example, a superhard surface provided by a plurality of superhard bearing elements 222, that may be positioned adjacent to the first end 228 of the first bearing ring 214, to provide a bearing surface for axial forces in a first direction. Similarly, the laterally extending member 254 at the second end 250 of the second support structure 240 of the second bearing ring 216 may include a hardened surface, such as, for example, a superhard surface provided by a plurality of superhard bearing elements 222, that may be positioned adjacent to the second end 230 of the first bearing ring 214, to provide a bearing surface for axial forces in an opposing second direction.

Each of the superhard bearing elements 222 may be fixedly secured to or within a corresponding recess in the first support structure 220 and second support structure 240, respectively, through brazing, press-fitting, threaded attachment, pin attachment, bonding, frictional engagement, and/or by any other suitable attachment mechanism, without limitation.

The first support structure 220 and the second support structure 240 may each be made from a variety of different materials. For example, the first support structure 220 and/or the second support structure 240 may comprise a metallic material (e.g., carbon steel, titanium or titanium alloys, tungsten or tungsten alloys, aluminum or aluminum alloys, or stainless steel, etc.), a carbide material (e.g., tungsten carbide, silicon carbide, etc.), or any other suitable material. In some embodiments, the first support structure 220 and/or the second support structure 240 may be made of a material with relatively high thermal conductivity (e.g., a thermal conductivity equal to or exceeding tungsten carbide or cobalt-cemented tungsten carbide).

In some embodiments, where the axial loading of the bearing assembly 200 is expected to be relatively small compared to the lateral loading, the bearing surfaces of the first end 228 and the second end 230 of the first bearing ring 214 and the bearing surfaces of the laterally extending members 254 of the second bearing ring 216 may be a material that is merely hardened, rather than a superhard material. In some embodiments, a hardfacing coating (e.g., tungsten carbide hardfacing) may be applied to the bearing surfaces of the first end 228 and the second end 230 of the first bearing ring 214 and the bearing surfaces of the laterally extending members 254 of the second bearing ring 216 by any suitable method, including, without limitation, flame spraying, welding HVOF (high velocity oxy-fuel coating spraying), and/or laser cladding.

In some embodiments, one or more other portions of the bearing assembly 200 and/or the coupler 210 may include hardfacing (e.g., as discussed above).

The coupler 210 may be coupled to the second bearing ring 216 with the mating feature 212. The mating feature 212 may substantially prevent (e.g., entirely prevent) the coupler 210 from rotating relative to the second bearing ring 216 while enabling the coupler 210 to move (e.g., translate, slide, displace) in an axial direction relative to the second bearing ring 216. The coupler 210 may additionally include a connecting feature 260 for connecting the coupler 210 to a component of a system, such as an end of a drive shaft.

The mating feature 212 may include an axially extending interface between the coupler 210 and the second bearing ring 216 having a polygonal-shaped lateral cross section, such as a hexagonal-shaped lateral cross section. In additional embodiments, the mating feature 212 may include other polygonal shapes, combinations of tracks and followers, grooves and protrusions, etc. In some embodiments, the at least one mating feature may comprise at least one pin, at least one fastener, at least one threaded element, at least one weld, at least one keyway, at least one spline, any suitable structure for limiting and/or preventing rotation between the coupler and the second bearing ring, or combinations of any of the embodiments disclosed herein.

As the surfaces of the interface extend axially, the coupler 210 may be configured to slide in an axial direction relative to the second bearing ring 216 and the first bearing ring 214. The coupler 210 may be prevented, however, from rotating relative to the second bearing ring 216. Accordingly, if an axial force is applied to the coupler 210, the mating feature 212 may enable the coupler 210 to slide axially relative to the second bearing ring 216, and if a torque is applied to the coupler 210, the coupler 210 may transfer the torque to the second bearing ring 216 through the mating feature 212 and cause the second bearing ring 216 to rotate relative to the first bearing ring 214. As mating surfaces of the coupler 210 and the second bearing ring 216 at the interface of the mating feature 212 may rub together during normal operations, the mating surfaces may be comprised of a hardened material. For example, a hardened material coating (e.g., hardfacing) may be applied to the mating surfaces of the coupler 210 and the second bearing ring 216 at the interface of the mating feature 212.

In view of the foregoing, the first bearing ring 214 may comprise a first row of superhard bearing elements 222 arranged around an intended axis of rotation 252 providing a first bearing surface. The second bearing ring 216 may comprise a second row of superhard bearing elements 222 arranged around the intended axis of rotation 252 providing a second bearing surface positioned adjacent the first bearing surface of the first bearing ring 214, the second bearing ring 216 configured for rotation relative to the first bearing ring 214 about the intended axis of rotation 252 and secured to limit and/or at least partially prevent e.g., minimize, entirely prevent, etc.) axial movement and lateral movement relative to the first bearing ring 214. Additionally, the coupler 210 may be configured to rotate with the second bearing ring 216 and slide in an axial direction relative to the second bearing ring 216.

Figure 2B:
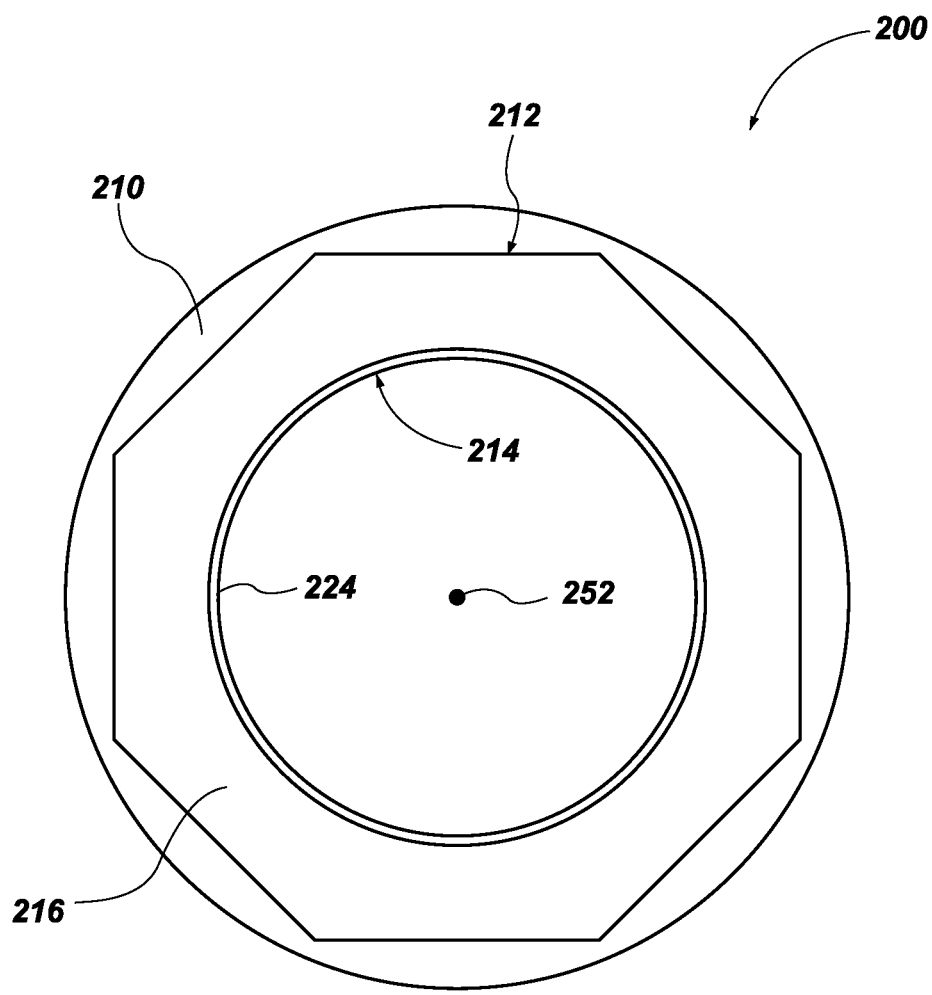
FIG. 2B is an end view of the bearing assembly of FIG. 2A.

FIG. 2B is an end view of the bearing assembly 200 of FIG. 2A. As shown, the first bearing ring 214 may be positioned radially within the second bearing ring 216. The aperture 224 of the first bearing ring 214 may have a smaller diameter than the laterally extending members 254 of the second bearing ring 216. Accordingly, the aperture 224 of the first bearing ring 214 may be sized to be fit on and coupled to an outer diameter of a system component. For example, the aperture 224 of the first bearing ring 214 may be sized to be press fit on a shaft.

As further shown, the first bearing ring 214 and the second bearing ring 216 may each be arranged circumferentially around the intended axis of rotation 252 about which the first bearing ring 214 and the second bearing ring 216 may rotate relative to one another. Additionally, both the first bearing ring 214 and the second bearing ring 216 may fit radially within the coupler 210.

Figure 2C:
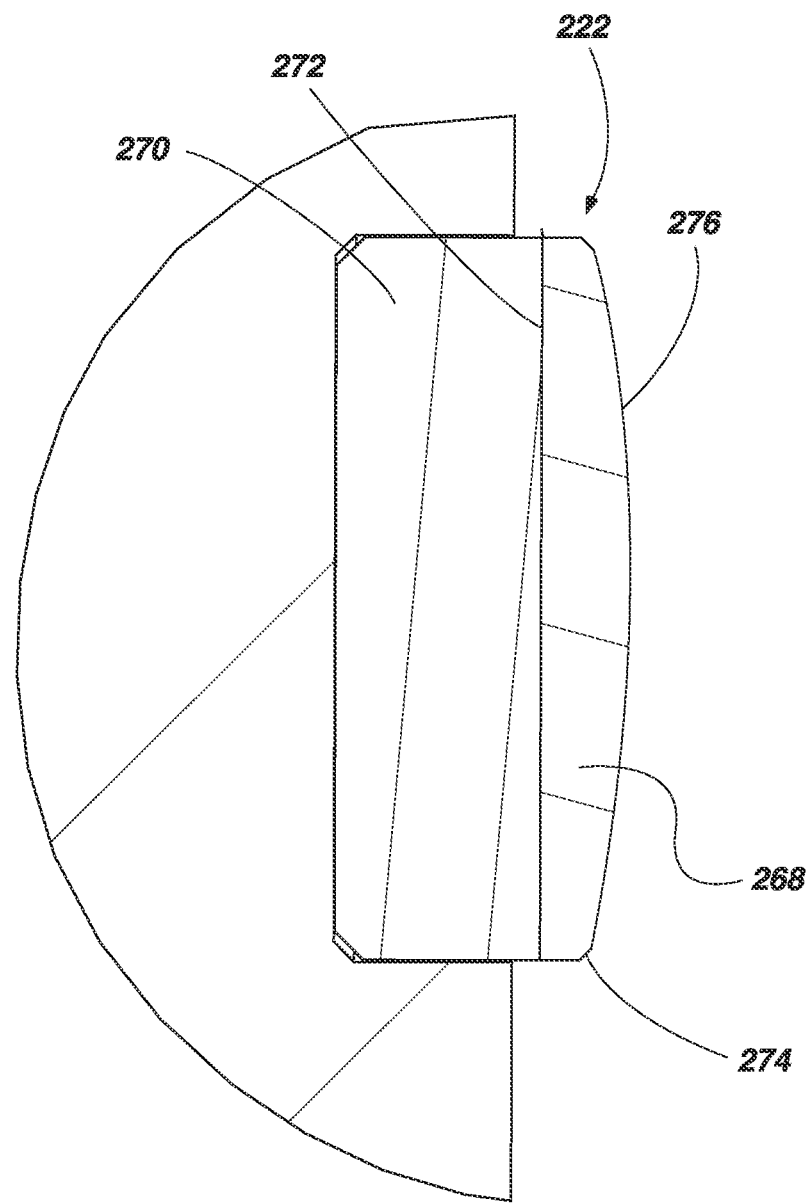
FIG. 2C a cross-sectional detail view of a portion of the bearing assembly of FIG. 2A.

FIG. 2C is a cross-sectional view of a portion of the bearing assembly 200 shown in FIG. 2A. As shown in FIG. 2C, the bearing element 222 may comprise a superhard table 268 affixed to or formed upon a substrate 270. The superhard table 268 may be affixed to a substrate 270 at an interface 272. A bearing element such as the bearing element 222 may be utilized with the first bearing ring 214 and/or the second bearing ring 216 of the bearing assembly 200, and for any of the additional embodiments described herein.

The bearing element 222 may also include a chamfer 274 between a side surface and a bearing surface 276. The chamfer 274 may comprise an angular, sloped, and/or rounded edge formed at the intersection of the side surface and the bearing surface 276. Any suitable surface shape may be formed at the intersection of the side surface and the bearing surface 276, such as those disclosed in U.S. Pat. No. 8,708,564, the disclosure of which is incorporated herein in its entirety by this reference. Any other suitable surface shape may also be formed between the side surface and the bearing surface 276, including, without limitation, an arcuate surface (e.g., a radius, an ovoid shape, or any other rounded shape), a sharp edge, multiple chamfers/radii, a honed edge, and/or combinations of the foregoing.

The bearing element 222 may comprise any suitable size, shape, and/or geometry, without limitation. As depicted, the bearing surface 276 may comprise a convex or concave shapes, including partially ellipsoidal, partially cylindrical, partially spheroid, partially spherical, partially circular, or substantially similar surface shape.

In some embodiments, the individual bearing surfaces 276 of the bearing elements 222 may each exhibit a convex shape that, taken together, collectively define a substantially partially spherical, cylindrical, and/or conical shape.

The substrate 270 may comprise any suitable material on which the superhard table 268 may be formed. In at least one embodiment, the substrate 270 may comprise a cemented carbide material, such as a cobalt-cemented tungsten carbide material and/or any other suitable material. In some embodiments, the substrate 270 may include a suitable metal-solvent catalyst material, such as, for example, cobalt, nickel, iron, and/or alloys thereof. The substrate 270 may also include any suitable material including, without limitation, cemented carbides such as titanium carbide, tungsten carbide, niobium carbide, tantalum carbide, vanadium carbide, chromium carbide, and/or combinations of any of the preceding carbides cemented with iron, nickel, cobalt, and/or alloys thereof. The superhard table 268 may be formed of any suitable superabrasive and/or superhard material or combination of materials, including, for example polycrystalline diamond (PCD). Any of the superhard tables disclosed herein may also comprise PCD materials, such as those disclosed in U.S. Pat. No. 7,866,418, the disclosure of which is incorporated herein, in its entirety, by this reference. According to additional embodiments, the superhard table 268 may comprise cubic boron nitride, silicon carbide, PCD, and/or mixtures or composites including one or more of the foregoing materials, without limitation.

The superhard table 268 of the bearing element 222 may be formed using any suitable technique. According to some embodiments, the superhard table 268 may comprise a PCD table fabricated by subjecting a plurality of diamond particles to a high pressure, high temperature (HPHT) sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. The bonded diamond grains (e.g., sp3-bonded diamond grains), so-formed by HPHT sintering the diamond particles, define interstitial regions with the metal-solvent catalyst disposed within the interstitial regions of the as-sintered PCD body. The diamond particles may exhibit a selected diamond particle size distribution or mixture.

Following sintering, various materials, such as a metal-solvent catalyst, remaining in interstitial regions within the as-sintered PCD body may reduce the thermal stability of the superhard table 268 at elevated temperatures. In some examples, differences in thermal expansion coefficients between diamond grains in the as-sintered PCD body and a metal-solvent catalyst in interstitial regions between the diamond grains may weaken portions of the superhard table 268 that are exposed to elevated temperatures, such as temperatures developed during bearing operation. The weakened portions of the superhard table 268 may become excessively worn and/or damaged during bearing operation.

Removing the metal-solvent catalyst and/or other materials from at least a portion of the as-sintered PCD body may improve the heat resistance and/or thermal stability of the superhard table 268, particularly in situations where the PCD material may be exposed to elevated temperatures. A metal-solvent catalyst and/or other materials may be removed (e.g., at least partially removed) from at least a portion of the as-sintered PCD body using any suitable technique, including, for example, leaching. In at least one embodiment, a metal-solvent catalyst, such as cobalt, may be removed from regions of the as-sintered PCD body, such as regions adjacent to the working surfaces of the superhard table 268. Removing a metal-solvent catalyst from the as-sintered PCD body may reduce damage to the PCD material of the superhard table 268 caused by expansion of the metal-solvent catalyst.

At least a portion of a metal-solvent catalyst, such as cobalt, as well as other materials, may be removed from at least a portion of the as-sintered PCD body using any suitable technique, without limitation. For example, chemical and/or gaseous leaching may be used to remove a metal-solvent catalyst from the as-sintered PCD body up to a desired depth from a surface thereof. The as-sintered PCD body may be leached by immersion in an acid, such as aqua regia, nitric acid, hydrofluoric acid, or subjected to another suitable process to remove at least a portion of the metal-solvent catalyst from the interstitial regions of the PCD body and form the superhard table 268 comprising a PCD table. For example, the as-sintered PCD body may be immersed in or exposed to the acid for about 2 to about 7 days (e.g., about 3, 5, or 7 days) or for a few weeks (e.g., about 4 weeks) depending on the process employed.

Even after leaching, a residual, detectable amount of the metal-solvent catalyst may be present in the at least partially leached superhard table 268. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may be at least partially removed by the selected leaching process or may be relatively unaffected by the selected leaching process.

In some embodiments, only selected portions of the as-sintered PCD body may be leached, leaving remaining portions of the resulting superhard table 268 in an unleached state. For example, some portions of one or more surfaces of the as-sintered PCD body may be masked or otherwise protected from exposure to a leaching solution and/or gas mixture while other portions of one or more surfaces of the as-sintered PCD body may be exposed to the leaching solution and/or gas mixture. Other suitable techniques may be used for removing a metal-solvent catalyst and/or other materials from the as-sintered PCD body or may be used to accelerate a chemical leaching process. For example, exposing the as-sintered PCD body to heat, pressure, electric current, microwave radiation, and/or ultrasound may be employed to leach or to accelerate a chemical leaching process, without limitation. Following leaching, at least a portion of the superhard table 268 may comprise a volume of PCD material that is substantially free of a metal-solvent catalyst.

The plurality of diamond particles used to form the superhard table 268 comprising the PCD material may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 μm and 20 μm). More particularly, in various embodiments, the plurality of diamond particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 15 μm, 12 μm, 10 μm, 8 μm, 4 μm, 2 μm, 1 μm, 0.5 μm, less than 0.5 μm, 0.1 μm, less than 0.1

μm). In another embodiment, the plurality of diamond particles may include a portion exhibiting a relatively larger size between about 40 μm and about 15 μm and another portion exhibiting a relatively smaller size between about 12 μm and 2 μm. Of course, the plurality of diamond particles may also include three or more different sizes (e.g., one relatively larger size and two or more relatively smaller sizes) without limitation.

Figure 3A:
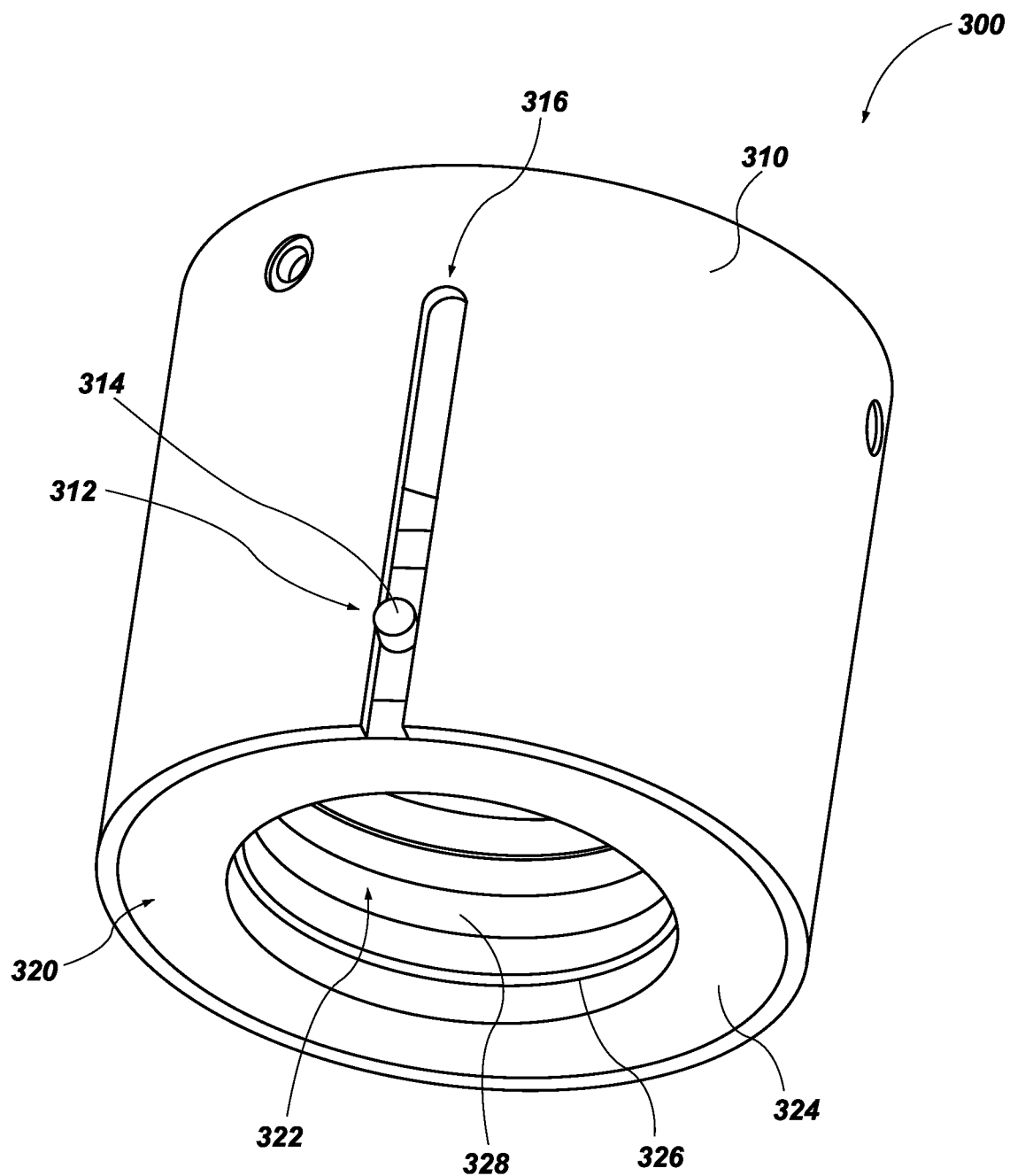
FIG. 3A is an isometric view of a bearing assembly including a coupler with a mating feature comprising a protrusion located in an axially extending channel according to an embodiment of the present disclosure.

FIG. 3A is an isometric view of a bearing assembly 300 including a coupler 310 with a mating feature 312 comprising a protrusion 314 located in an axially extending channel 316 according to an embodiment of the present disclosure. The bearing assembly 300 includes a first bearing ring 320, a second bearing ring 322, and the coupler 310. As depicted, the channel 316 may be open at one axial end. The open channel 316 may, for example, assist in assembly of the bearing assembly 300 and coupler 310 where the bearing assembly 300 may be assembled in place (e.g., in situ) by sliding the bearing assembly 300 into the coupler 310.

The first bearing ring 320 may be substantially the same as the first bearing ring 214 described with reference to FIGS. 2A and 2B, and may comprise an annular support structure 324 having a plurality of superhard bearing elements 326 extending therefrom. Further, the first bearing ring 320 may have an annular support structure 324 having a plurality of superhard bearing elements 326 extending therefrom having an annular (e.g., circular) outer circumference 330. As above, the first bearing ring 320 may at least partially contain the second bearing ring 322 such that the first bearing ring 320 remains axially aligned with the second bearing ring 322. As noted above, while the contained bearing assembly 300 is shown with an axial movement feature, in additional embodiments, the contained bearing assembly 300 may lack such features (e.g., may be substantially axially fixed).

The second bearing ring 322 may be substantially the same as the second bearing ring 216 described with reference to FIGS. 2A and 2B, and may comprise an annular support structure 328 having a plurality of superhard bearing elements 326 extending therefrom. The second bearing ring 322 may be sized and configured so that the second bearing ring 322 is positioned radially within the first bearing ring 320 in a nested configuration. Accordingly, the first bearing ring 320 and the second bearing ring 322 may each be arranged circumferentially around an intended axis of rotation 334 about which the first bearing ring 320 and the second bearing ring 322 may rotate relative to one another.

Figure 3B:
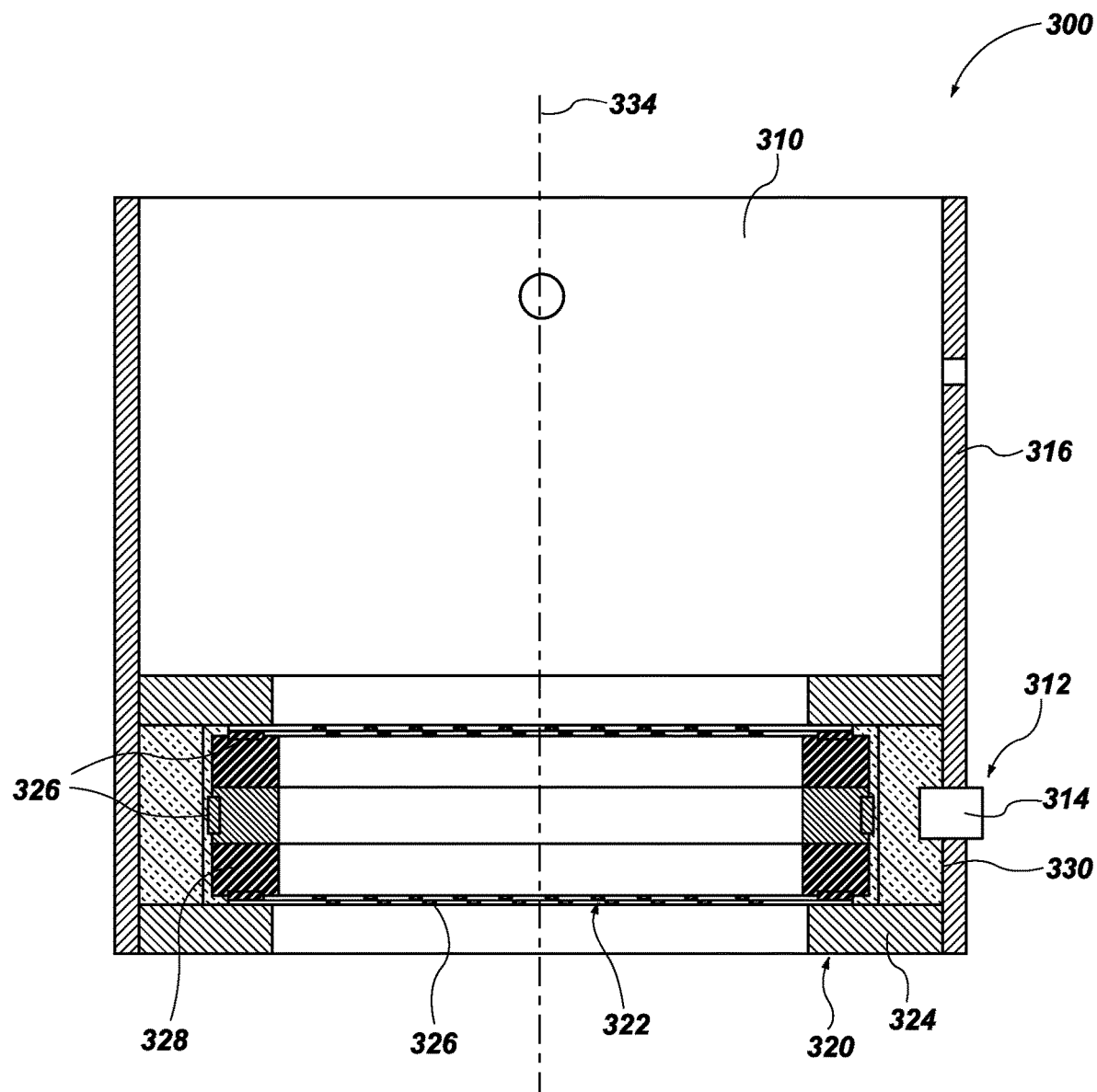
FIG. 3B is a cross-sectional side view of the bearing assembly of FIG. 3A.

As shown in a side cross-sectional view of the bearing assembly 300 in FIG. 3B, the coupler 310 may be coupled to the first bearing ring 320 with the mating feature 312. The mating feature 312 may limit and/or at least partially prevent the coupler 310 from rotating relative to the first bearing ring 320 (e.g., comprising an annular ring) and may allow the coupler 310 to slide in an axial direction relative to the first bearing ring 320. The mating feature 312 may include the protrusion 314 and the axially extending channel 316. For example, the protrusion 314 (e.g., a pin), may extend from the first bearing ring 320 radially outward and may be positioned in the axially extending channel 316 of the coupler 310. The protrusion 314 and the axially extending channel 316 may have a similar width, such that the protrusion 314 may contact one of the edges of the axially extending channel 316 when the coupler 310 is rotated and limit/prevent the first bearing ring 320 from rotating relative to the coupler 310. If an axial force is applied to the coupler 310, however, the axially extending channel 316 may allow the protrusion 314 to move axially through the axially extending channel 316 and the coupler 310 may slide axially relative to the first bearing ring 320. If a torque is applied to the coupler 310, the coupler 310 may transfer the torque to the first bearing ring 320 through the mating feature 312 and cause the first bearing ring 320 to rotate relative to the second bearing ring 322. As mating surfaces of the coupler 310 and the first bearing ring 320 at the interface of the mating feature 312 may rub together during normal operations, the mating surfaces may be comprised of a hardened material (e.g., hardfacing). For example, a hardened material coating may be applied to the mating surfaces.

Figure 4:
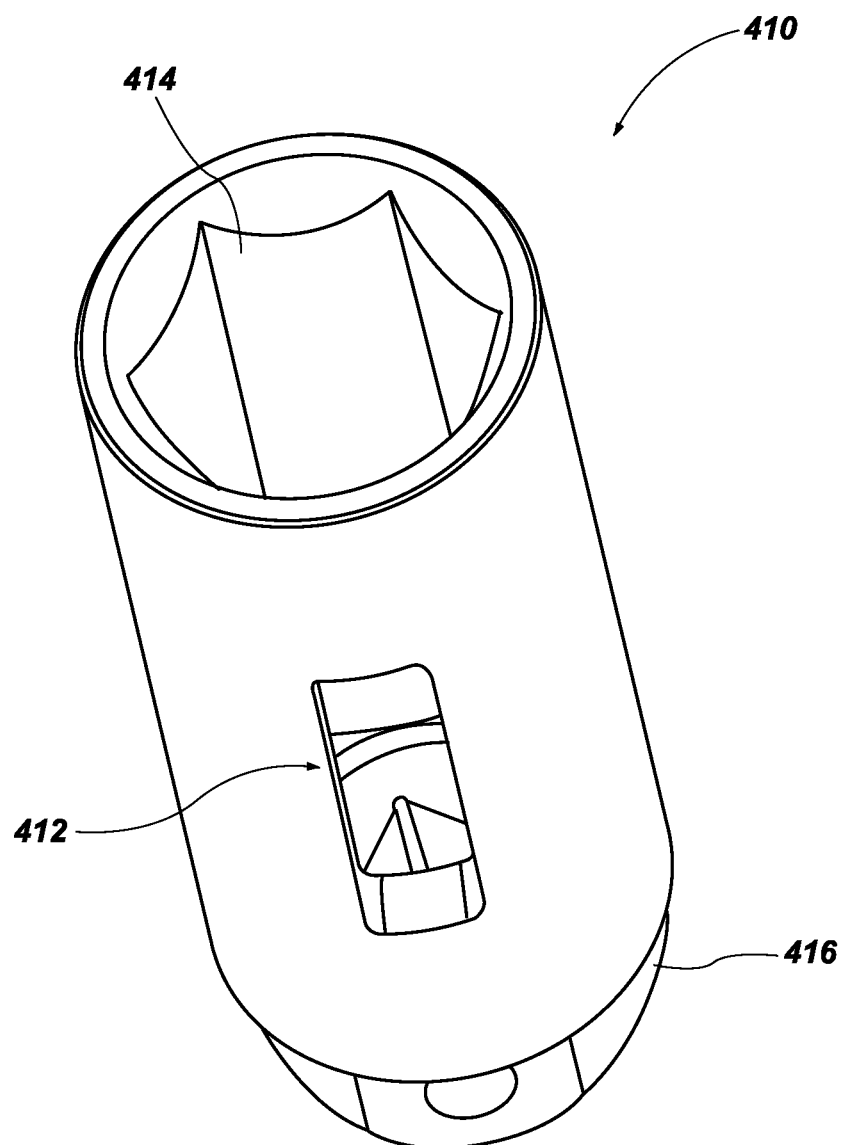
FIG. 4 shows an isometric view of a coupler for a bearing assembly with a mating feature comprising both a protrusion located in an axially extending channel and an axially extending interface with a polygonal-shaped lateral cross section according to an embodiment of the present disclosure.

FIG. 4 shows an isometric view of a coupler 410 for a bearing assembly with an inner mating feature comprising an axially extending channel 412 for receiving a complementary protrusion of a bearing assembly and an axially extending interface 414 with a polygonal-shaped lateral cross section according to an embodiment of the present disclosure. The coupler 410 may be utilized, for example, with the first bearing ring 214 and the second bearing ring 216 such as described with reference to FIGS. 2A and 2B, with the addition of a protrusion (e.g., such as that shown in FIGS. 3A and 3B) added to the second bearing ring 216 at a location such that the protrusion extends through the axially extending channel 412 of the coupler 410.

In some embodiments, the axially extending channel 412 may comprise an axially closed channel as opposed to the axially open channel 316 (i.e., open at one end) shown in FIGS. 3A and 3B.

In some embodiments, the coupler 410 may further comprising an outer mating feature 416 configured to engage with another component positioned on an axial end of the coupler 410 such that torque may be transferred between the another component and the coupler 410.

Figure 5A:
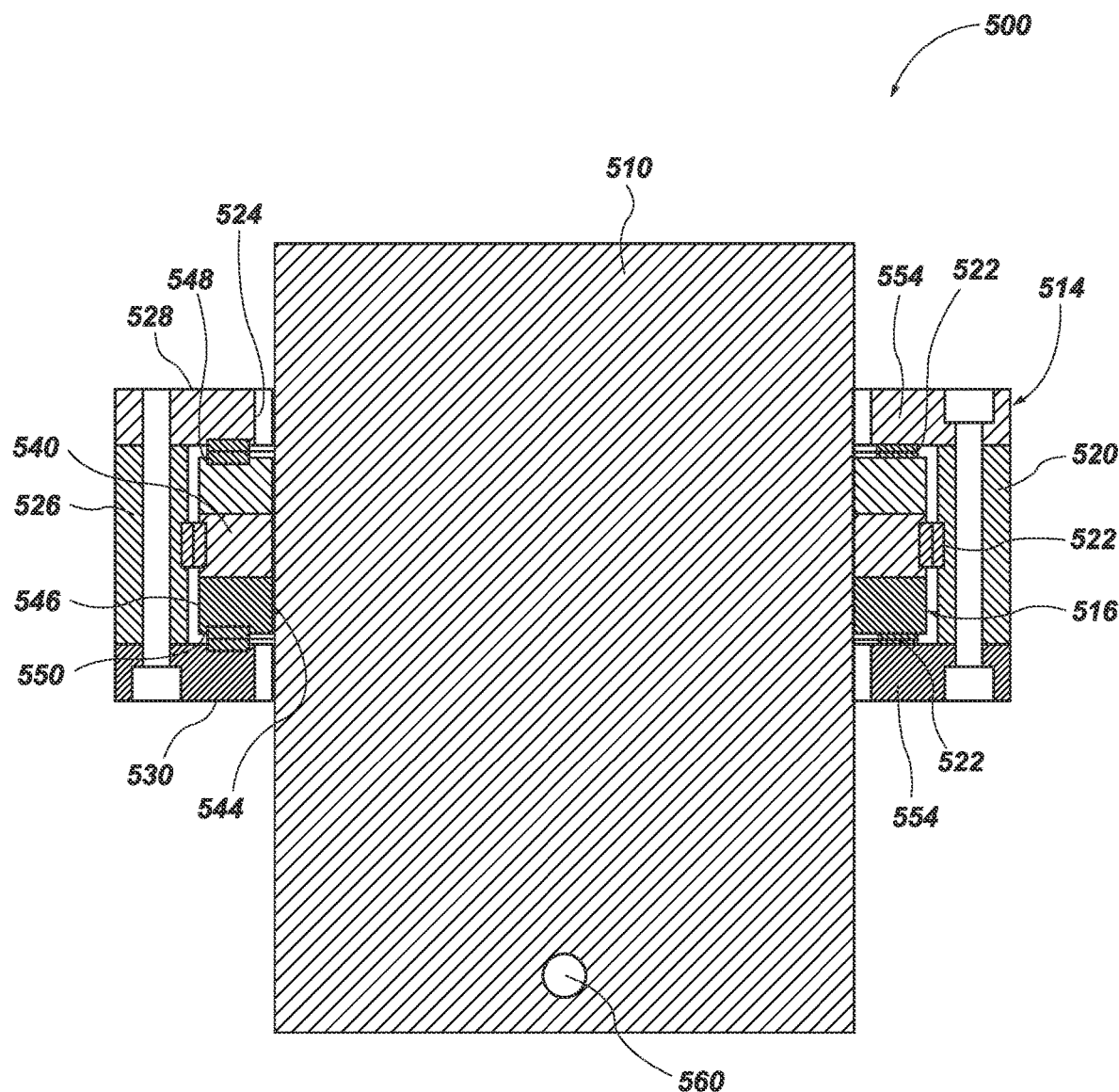
FIG. 5A is a side cross-sectional view of an additional bearing assembly having a coupler located at a radial interior location according to an embodiment of the present disclosure.
Figure 5B:
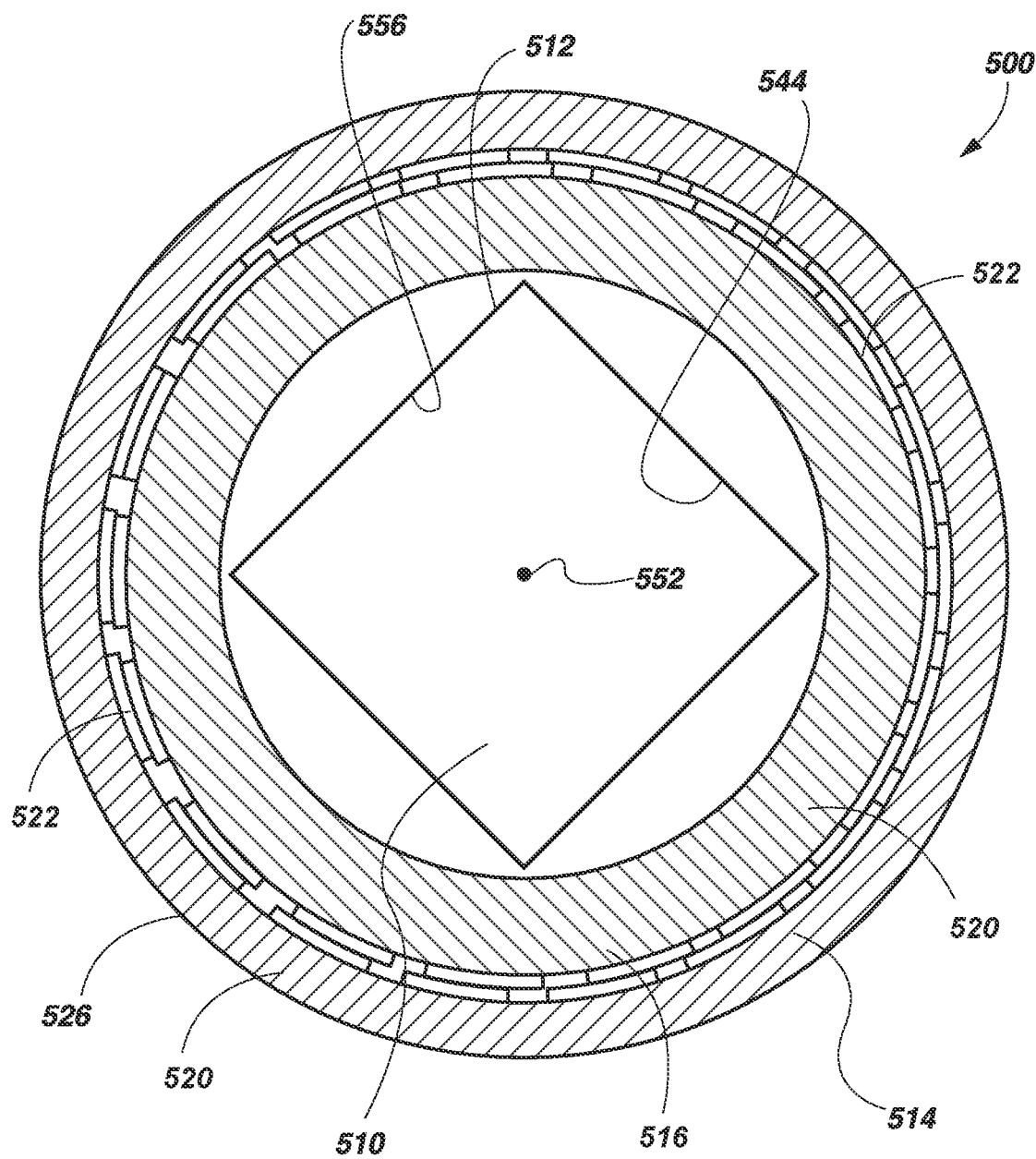
FIG. 5B is an end view of the bearing assembly of FIG. 5A.

FIG. 5A is a side cross-sectional view of a bearing assembly 500 having a coupler 510 located at a radially interior location according to an embodiment of the present disclosure. The bearing assembly 500 may include a first bearing ring 514, a second bearing ring 516, and the coupler 510. FIG. 5B is an end view of the bearing assembly 500.

The first bearing ring 514 may comprise an annular support structure 520 having a plurality of superhard bearing elements 522 extending therefrom. The support structure 520 may comprise an inner circumference 524, an outer circumference 526, a first end 528, and an opposing second end 530.

A row of superhard bearing elements 522 may be located on the outer circumference of the support structure 520 of the first bearing ring 514 to provide a bearing surface configured to bear lateral loading (e.g., radial loading perpendicular to an intended axis of rotation). In some embodiments, a single row of superhard bearing elements 522 may be located on the inner circumference of the support structure 520 of the first bearing ring 514 to provide a bearing surface configured to bear lateral loading. In additional embodiments, multiple rows of superhard bearing elements 222 may be implemented.

Similar to the first bearing ring 514, the second bearing ring 516 may comprise an annular support structure 540 having a plurality of superhard bearing elements 522 extending therefrom. The support structure 540 may comprise an inner aperture 544, an outer perimeter 556 defining the inner aperture 544, and outer circumference 546, a first end 548, and an opposing second end 550. The second bearing ring 516 may be sized and configured so that the second bearing ring 516 is positioned radially within (e.g., contained within) the first bearing ring 514 in a nested configuration. Accordingly, the first bearing ring 514 and the second bearing ring 516 may each be arranged circumferentially around an intended axis of rotation 552 about which the first bearing ring 514 and the second bearing ring 516 may rotate relative to one another. As noted above, while the contained bearing assembly 500 is shown with an axial movement feature, in additional embodiments, the contained bearing assembly 500 may lack such features (e.g., may be substantially axially fixed).

The support structure 520 of the first bearing ring 514 may additionally include laterally extending members 554 at the first end 528 and the second end 530 that may extend over a portion of the first end 548 and the second end 550 of the second bearing ring 516, respectively, and restrict the axial movement of the second bearing ring 516 relative to the first bearing ring 514. Accordingly, the support structure 520 of the first bearing ring 514 may be formed in multiple sections that may be assembled together after the second bearing ring 516 is positioned radially within a central portion of the first bearing ring 514.

A row of superhard bearing elements 522 may be located on an inner portion of the support structure 520 of the first bearing ring 514 positioned to contact the superhard bearing elements 522 of the second bearing ring 516 and to provide a bearing surface configured to bear lateral loading (e.g., radial loading perpendicular to an intended axis of rotation).

The laterally extending member 554 at the first end 528 of the support structure 520 of the first bearing ring 514 may include a hardened surface that may be positioned adjacent to the first end 548 of the second bearing ring 516, to provide a bearing surface for axial forces in a first direction. Similarly, the laterally extending member 554 at the second end 530 of the support structure 520 of the first bearing ring 514 may include a hardened surface that may be positioned adjacent to the second end 550 of the second bearing ring 516, to provide a bearing surface for axial forces in an opposing second direction.

The first bearing ring 514 may be configured to couple to a first member of a system. For example, the outer circumference 526 of the first bearing ring 514 may be sized and configured for a press fit with the first member of the system.

The coupler 510 may be coupled within the inner perimeter 556 of the second bearing ring 516 defining the aperture 544 with a mating feature 512 that limits/prevents the coupler 510 from rotating relative to the second bearing ring 516 and that enables the coupler 510 to slide in an axial direction relative to the second bearing ring 516. The coupler 510 may additionally include a connecting feature 560 for connecting the coupler 510 to a second member of the system, the second member configured for rotation relative to the first member of the system.

The mating feature 512 may include an axially extending interface between the coupler 510 and the second bearing ring 516 having a polygonal-shaped lateral cross section, such as, for example, a square-shaped lateral cross section. In additional embodiments, the mating feature 512 may include one or more other features to at least prohibit relative rotation (e.g., the pins, channels, or other features discussed above).

As the surfaces of the interface extend axially, the coupler 510 may be configured to slide in an axial direction relative to the second bearing ring 516 and the first bearing ring 514. The coupler 510 may be limited or prevented, however, from rotating relative to the second bearing ring 516. Accordingly, if an axial force is applied to the coupler 510, the mating feature 512 may allow the coupler 510 to slide axially relative to the second bearing ring 516, and if a torque is applied to the coupler 510, the coupler 510 may transfer the torque to the second bearing ring 516 through the mating feature 512 and cause the second bearing ring 516 to rotate relative to the first bearing ring 514. As mating surfaces of the coupler 510 and the second bearing ring 516 at the interface of the mating feature 512 may rub together during normal operations, the mating surfaces may be comprised of a hardened material (e.g., hardfacing, a material including tungsten, a material including tungsten carbide, a material including a carbide, etc.). For example, a hardened material coating may be applied to the mating surfaces.

In operation, in some instances, bearing assemblies 200, 300, 500 according to embodiments of the present disclosure may be utilized in a system to accommodate axial movement between members of the system in relative rotation. A first member of the system may be fixably connected to a first bearing ring 214, 320, 514, and a second member of the system may be fixably connected to a coupler 210, 310, 410, 510. Accordingly, the second member of the system may be rotated relative to the first member of the system and the first bearing ring 214, 320, 514 and the second bearing ring 216, 322, 516 may provide a bearing interface to facilitate the rotation of the second member relative to the first member while maintaining the lateral location of the first member relative to the second member. Additionally, the bearing assembly 200, 300, 500 may maintain the axial alignment of the first superhard bearing elements 222, 326, 522 of the first bearing ring 214, 320, 514 with the second superhard bearing elements 222, 326, 522 of the second bearing ring 216, 322, 516 while the coupler 210, 310, 410, 510 slides axially relative to the second bearing ring 216, 322, 516 to accommodate axial movement between the first member of the system relative to the second member of the system.

Figure 6:
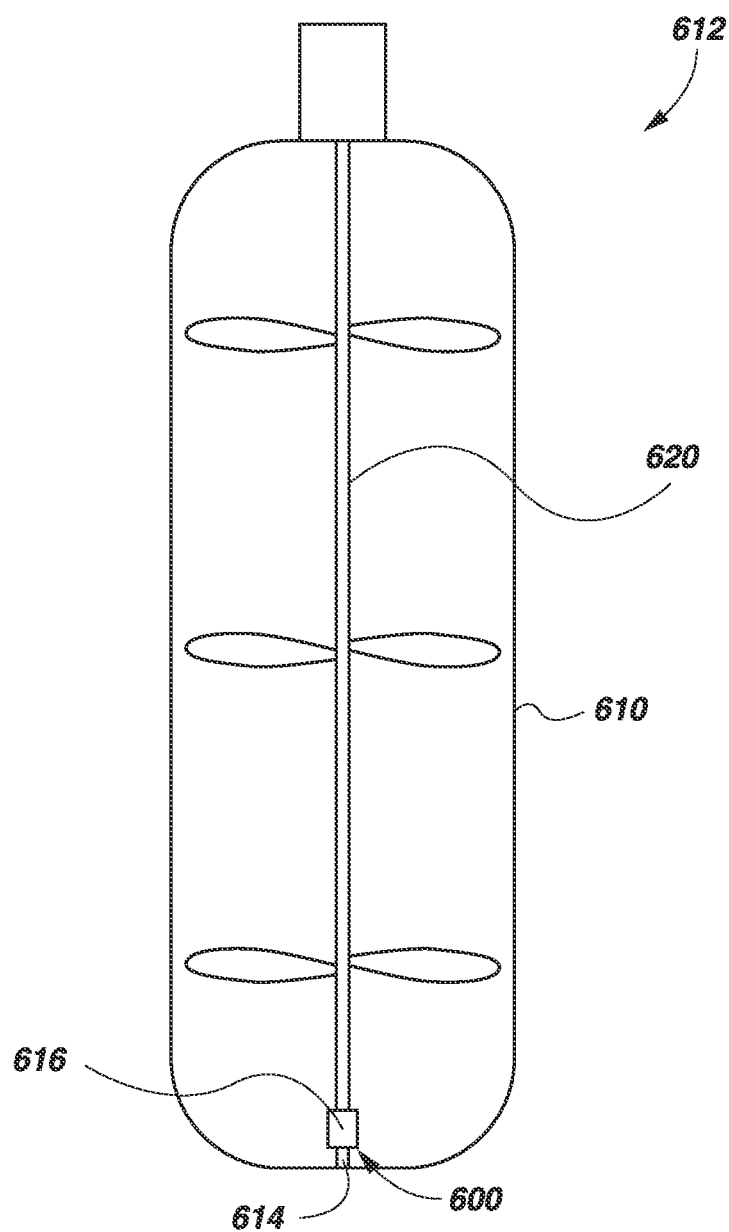
FIG. 6 is a partial cross-sectional view of a system with a bearing assembly according to an embodiment of the present disclosure.

For example, as shown in FIG. 6, a bearing assembly 600 (e.g., which may be substantially the same or identical to the bearing assemblies and couplers discussed above or below, for example, bearing assembly 200 described with reference to FIGS. 2A through 2C) may be utilized within a mixing tank 610 of a mixer 612, such as a chemical reactor system mixer. A first bearing ring may be fixably coupled to an end support 614 mounted at or near a bottom of the mixing tank 610, and a coupler 616 may be fixably coupled to an end of a mixing blade drive shaft 620. In operation, the mixing blade drive shaft 620 may be rotated and the bottom end of the mixing blade drive shaft 620 may move in an axial direction relative to the end support 614. The bearing assembly 600 may operate to maintain the axial alignment of first superhard bearing elements of the first bearing ring with the second superhard bearing elements of a second bearing ring while the coupler 616 slides axially relative to the second bearing ring to accommodate the axial movement of the bottom end of the mixing blade drive shaft 620 relative to the end support 614.

Because the bearing assembly 600 incorporates superhard bearing surfaces provided by the first superhard bearing elements of the first bearing ring with the second superhard bearing elements of the second bearing ring, the bearing assembly 600 may not require any seals to prevent the fluid in the system from entering the bearing assembly 600, and the bearing assembly 600 may not require lubricating fluid (e.g., grease). For example, the first superhard bearing elements and the second superhard bearing elements of the bearing assembly 600 may be exposed to fluid being mixed in the mixing tank 610 of the mixer 612.

Figure 7:
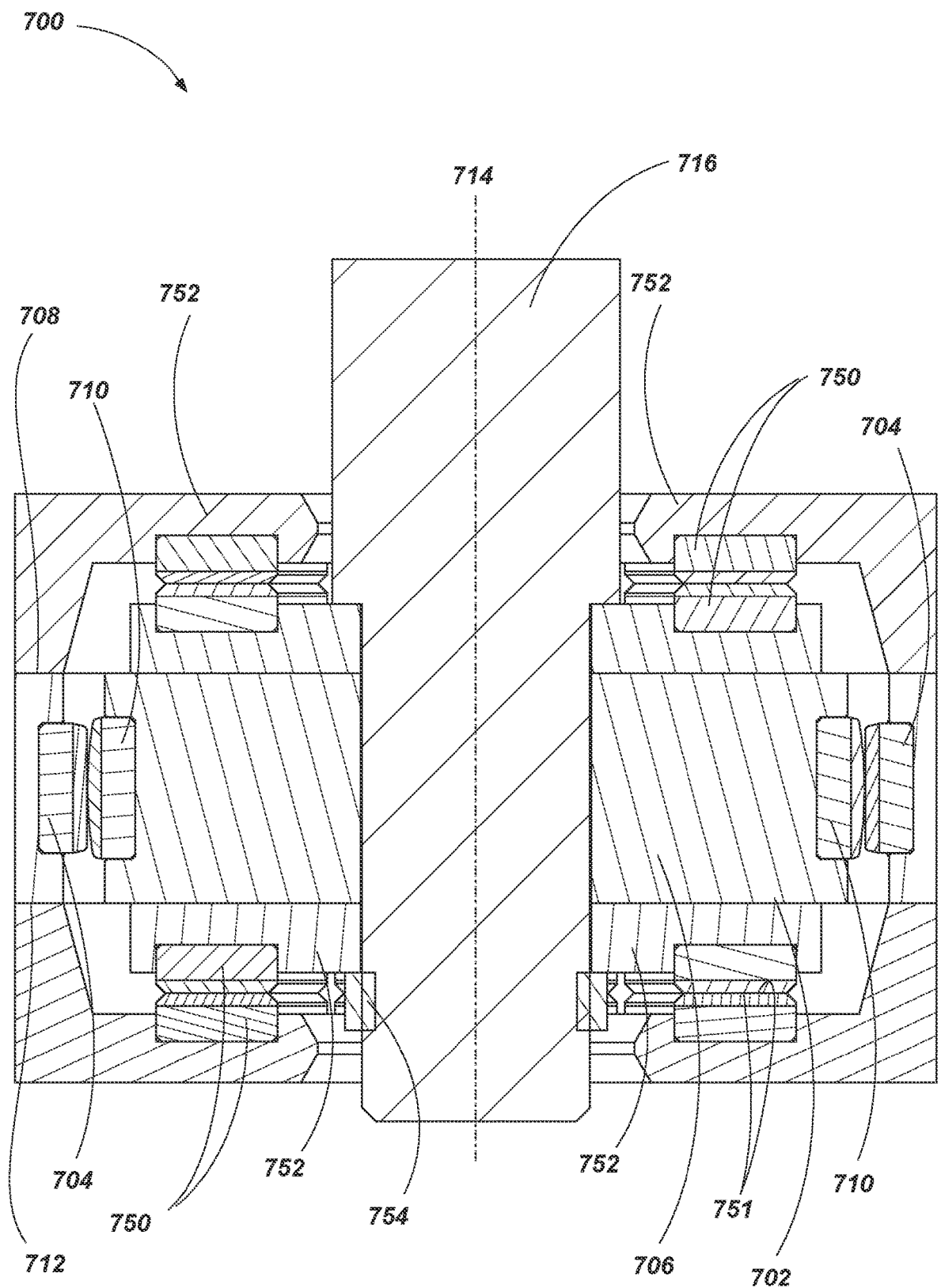
FIG. 7 is a cross-sectional view of a force coupling assembly including thrust bearing elements according to an embodiment of the disclosure.

FIG. 7 is a cross-sectional view of a contained bearing assembly 700 including one or more thrust bearing elements 750 (e.g., providing bearing surfaces for axial and/or thrust loadings). In some embodiments, the bearing assembly 700 may include the thrust bearing elements 750 (e.g., three or more discrete thrust bearing elements 750) along with lateral or radial bearing elements 704, 710 that may be similar those discussed above (e.g., for handling at least partially lateral forces). For example, bearing assembly 700 may include first bearing assembly 702 and second bearing element 708, each including the bearing elements 704, 710 coupled to inner support structure 706 and outer support structure 712 for primarily lateral forces or loads between the first bearing assembly 702 and the second bearing element 708. As discussed above, in some embodiments, the thrust bearing elements 750 may comprise one or more hardened surfaces instead of, or in addition to, discrete elements (e.g., discrete superhard elements).

As depicted, contact surfaces 751 of the thrust bearing elements 750 may be primarily positioned in (e.g., extending along) a direction transverse (e.g., offset, oblique, perpendicular) to a longitudinal axis 714 of the bearing assembly 700. In such a configuration the thrust bearing elements 750 may act to support a primarily axial load through superhard materials of the thrust bearing elements 750 (e.g., diamond and/or other materials as discussed above). For example, the thrust bearing elements 750 may be positioned to support loads or forces that are at least partially directed (e.g., primarily directed, a majority of being directed) in an axial direction along the longitudinal axis 714. In some embodiments, the axial loads or forces may be directed at least partially along an axis of rotation of a portion of the bearing assembly 700 (e.g., along the shaft 716). Such an axial load capability may be achieved through the thrust bearing elements 750 that are separate from the bearing elements 704, 710, where the bearing elements 704, 710 are configured to primarily handle lateral forces.

In some embodiments, the bearing assembly 700 may be modular with the respective shaft 716 (e.g., removable). For example, a retaining element 754 (e.g., a retaining nut) may secure the first bearing assembly 702 to the shaft 716.

As shown in FIG. 7, a majority of the contact surfaces 751 of the thrust bearing elements 750 may be oriented substantially perpendicular to the longitudinal axis 714 of bearing assembly 700 in a standard axial load configuration (e.g., where the support structures 706, 712 generally do not tilt relative to each other). In additional embodiments, the contact surfaces 751 of the thrust bearing elements 750 may be oriented at an angle relative to the longitudinal axis 714 of bearing assembly 700 (e.g., as shown below in FIG. 8, where the support structures may tilt relative to each other).

Figure 8:
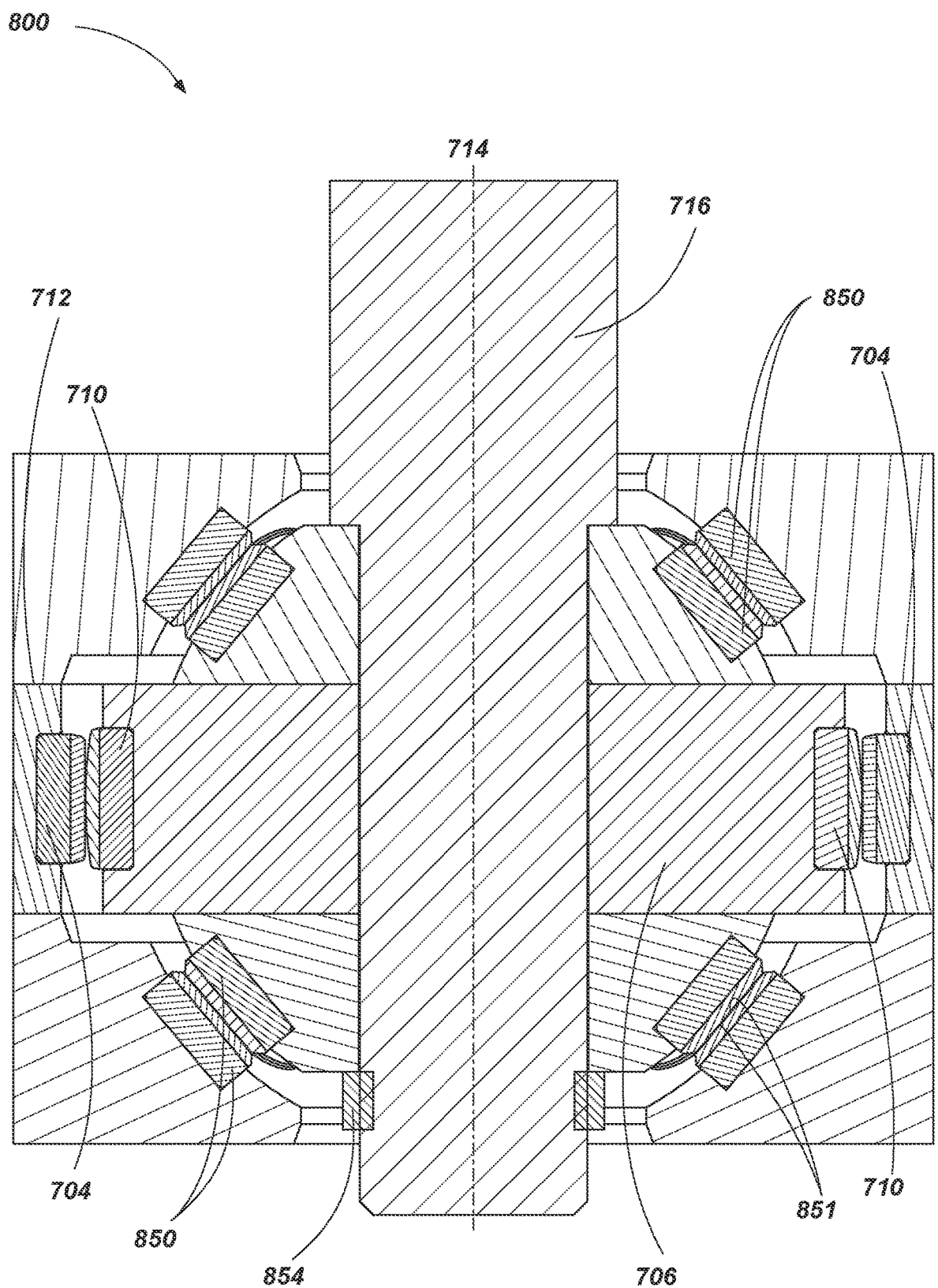
FIG. 8 is a cross-sectional view of another force coupling assembly including thrust bearing elements according to an embodiment of the disclosure.

In some embodiments, the thrust bearing elements 750 may be positioned on both axial sides of the first bearing assembly 702 (e.g., as shown in FIGS. 7 and 8) to provide axial load bearing in both axial directions. For example, the thrust bearing elements 750 may be positioned on both axial sides of the bearing elements 704, 710.

In additional embodiments, the thrust bearing elements 750 may be positioned on one axial side of the first bearing assembly 702 to provide axial load bearing in one axial direction.

In some embodiments, the thrust bearing elements 750 may be included on the same structure that support the lateral bearing elements (e.g., on the support structures 706, 712 along with the bearing elements 704, 710). In additional embodiments, and as depicted in FIGS. 7 and 8, the thrust bearing elements 750 may be positioned on support elements 752 that are separate from (e.g., but connected to) the support structures 706, 712. In some embodiments, the support elements 752 may be able to move (e.g., rotate) relative to one or both of the support structures 706, 712.

As above, the outer support structure 712 may at least partially surround and/or encompass the inner support structure 706 to at least partially contain the inner support structure 706 during operation. For example, while the inner support structure 706 and the outer support structure 712 may rotate relative to each other, the outer support structure 712 contains the inner support structure 706 such that the inner support structure 706 is substantially or entirely fixed in the axial direction.

FIG. 8 is a cross-sectional view of another bearing assembly 800 including thrust bearing elements 850, which may be similar to those discussed above. The bearing assembly 800 may include both lateral or radial bearing elements 704, 710 and thrust bearing elements 850 position on support structures 706, 712 (e.g., which may be integrated or separate radial and thrust structures as discussed above).

As noted above, the thrust bearing elements 850 may be oriented at an angle relative to the longitudinal axis 814 of bearing assembly 800. For example, the thrust bearing elements 850 may be oriented at an oblique angle relative to the longitudinal axis 814 of bearing assembly 800, such as 1 to 90 degrees, about 30 degrees, about 45 degrees, about 60 degrees, variations therebetween, etc.). The thrust bearing elements 850 may be oriented at an oblique angle relative to contact surfaces 851 of the bearing elements 704, 710. Such configurations may enable the support structures 706, 712 to tilt relative to each other.

As noted above, the bearing assembly 800 may be modular with the respective shaft 816 (e.g., removable). For example, a retaining element 854 (e.g., a retaining nut) may secure the support structure 706 to the shaft 716.

As above, contact surfaces 851 of the bearing elements 704, 710 may include any shapes discussed herein. Similarly, the thrust bearing elements 750, 850 may include contact surfaces 851 having matching or dissimilar surfaces comprising any of the surfaces discussed herein. For example, contact surfaces 851 of the thrust bearing elements 750, 850 may include one or more of flat on flat, taper on flat, sphere on flat, taper on taper (e.g., frustoconical), sphere on taper, sphere on sphere, combinations thereof, etc.

Figure 9:
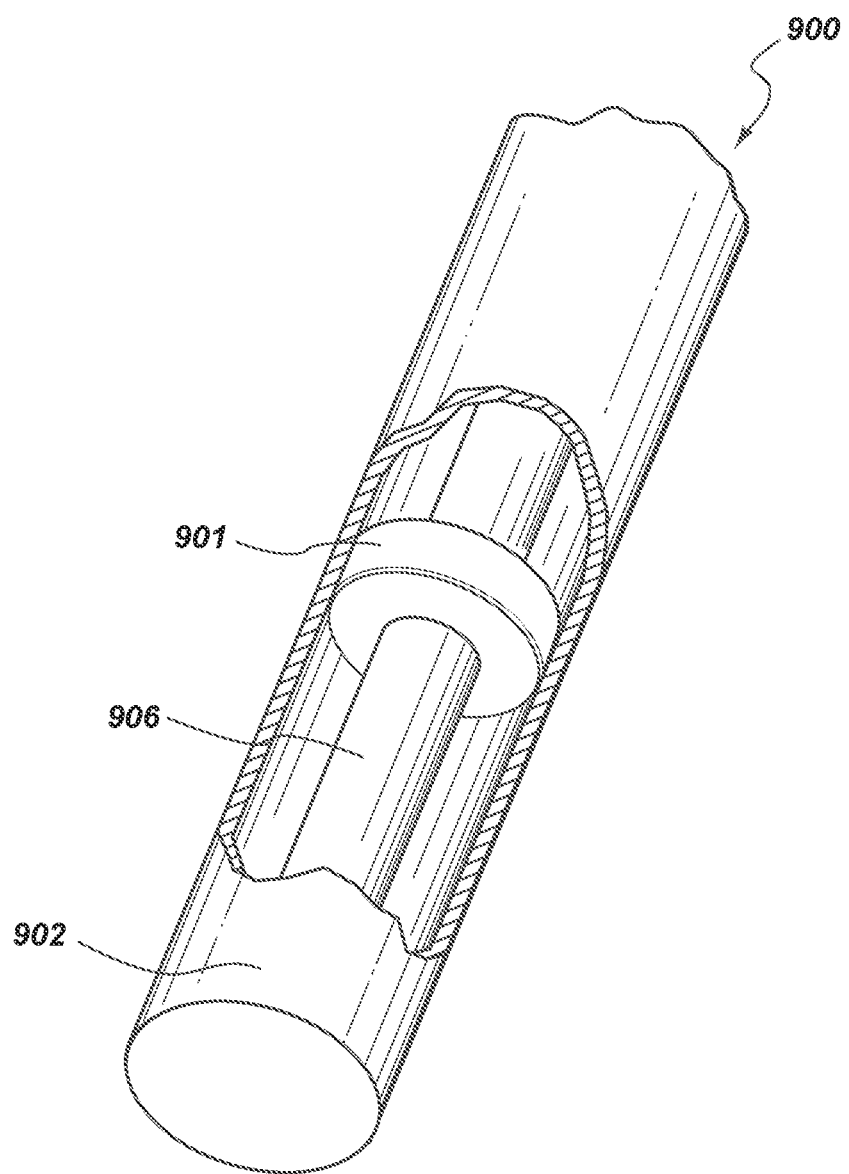
FIG. 9 is a partial cross-sectional view of a system with a bearing assembly according to an embodiment of the present disclosure.

FIG. 9 is a partial cross-sectional perspective view of an exemplary system 900 that system that includes a contained bearing apparatus 901, which may be similar to any of those discussed above. As shown in FIG. 9, system 900 may include a housing 902 with an output shaft 906 that is operably connected to prime mover (e.g., a motor, turbine, or any other suitable device capable of rotating the output shaft 906, without limitation).

Bearing apparatus 900 may be operably coupled to the output shaft 906 such that the rotor or assembly of the bearing apparatus 901 rotates in conjunction with output shaft 906, while the stator or another assembly of the bearing apparatus 901 remains stationary with respect to output shaft 906. Another component of the system 900 to be rotated and supported y the bearing apparatus 901 may be coupled to the output shaft 906.

Terms of degree (e.g., "about," "substantially," "generally," etc.) indicate structurally or functionally insignificant variations. In an example, when the term of degree is included with a term indicating quantity, the term of degree is interpreted to mean±10%, ±5%, or +2% of the term indicating quantity. In an example, when the term of degree is used to modify a shape, the term of degree indicates that the shape being modified by the term of degree has the appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, et cetera.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. Further, the words "including," "having," and variants thereof (e.g., "includes" and "has") as used herein, including the claims, shall be open ended and have the same meaning as the word "comprising" and variants thereof (e.g., "comprise" and "comprises"). In addition, features from one embodiment may be combined with features of another embodiment while still being encompassed within the scope of the disclosure as contemplated by the inventors.

What is claimed is:

1. A bearing assembly, comprising:
   an inner assembly including an inner support ring positioned about an inner ring axis;
   an outer assembly including an outer support ring positioned about an outer ring axis;
   superhard contact elements coupled to the inner support ring and the outer support ring having superhard contact surfaces, the inner assembly configured to move relative to the outer assembly when a rotational force is applied to the bearing assembly; and
   one or more thrust bearing elements comprising a hardened surface configured to at least partially contain the inner assembly relative to the outer assembly, the one or more thrust bearing elements positioned and configured to support the bearing assembly when an axial loading is applied between the inner assembly and the outer assembly in a direction at least partially along at least one of the inner ring axis or the outer ring axis.

2. The bearing assembly of claim 1, wherein the one or more thrust bearing elements each comprise additional superhard contact elements.

3. The bearing assembly of claim 2, wherein the superhard contact surfaces of at least some of the superhard contact elements and the additional superhard contact elements comprise one or more of a substantially planar surface, a partially convex spherical surface, a partially concave spherical surface, a partially convex substantially cylindrical surface, or a partially concave substantially cylindrical surface.

4. The bearing assembly of claim 2, wherein the inner assembly further comprises an inner thrust bearing support structure supporting a first set of the additional superhard contact elements and the outer assembly further comprises an outer thrust bearing support structure supporting a second set of the additional superhard contact elements.

5. The bearing assembly of claim 4, wherein the inner thrust bearing support structure and the outer thrust bearing support structure are separate and distinct from the inner support ring and the outer support ring.

6. The bearing assembly of claim 4, wherein the inner thrust bearing support structure and the outer thrust bearing support structure are integrated with the inner support ring and the outer support ring.

7. The bearing assembly of claim 1, wherein the inner support ring is configured to tilt relative to the outer support ring while at least some of the superhard contact elements remain in contact with each other.

8. The bearing assembly of claim 1, wherein the one or more thrust bearing elements comprises a thrust bearing support structure at least partially encompassing at least one of the inner assembly or the outer assembly.

9. The bearing assembly of claim 1, wherein the one or more thrust bearing elements extends in a direction at an oblique angle to at least one of the inner ring axis or the outer ring axis or in a direction that is substantially perpendicular to at least one of the inner ring axis or the outer ring axis.

10. The bearing assembly of claim 9, wherein the one or more thrust bearing elements at least partially prevent axial movement of the inner support ring relative to the outer support ring.

11. The bearing assembly of claim 1, wherein at least some of the superhard contact elements and the one or more thrust bearing elements comprise at least one of polycrystalline diamond, a carbide material, or a nitride material.

12. A rotary motion system, comprising:
    a shaft;
    a rotational energy device configured to apply torque to the shaft in order to rotate the shaft; and
    at least one bearing assembly comprising the bearing assembly of claim 1 operably coupled to the shaft and another component, a portion of the at least one bearing assembly configured to rotate in response to at least some of the torque applied to the shaft by the rotational energy device.

13. A bearing assembly, comprising:
    a first assembly including a first support ring positioned about a first ring axis;
    a second assembly including a second support ring positioned about a second ring axis;
    superhard contact elements coupled to the first support ring and the second support ring, superhard contact surfaces of the superhard contact elements configured to rotated relative to each other when a rotational force is applied to the bearing assembly; and
    one or more thrust bearing elements configured to contain the first assembly at least partially within the second assembly, the one or more thrust bearing elements positioned and configured to support the first assembly in response to a thrust force applied between the first assembly and the second assembly in a direction at least partially along at least one of the first ring axis or the second ring axis.

14. The bearing assembly of claim 13, wherein a thrust contact surface of the one or more thrust bearing elements is positioned at least one of transverse to or substantially perpendicular to at least one of the first ring axis or the second ring axis.

15. The bearing assembly of claim 13, wherein the first assembly is contained at least partially within a thrust support structure of the second assembly comprising the one or more thrust bearing elements.

16. The bearing assembly of claim 15, wherein the one or more thrust bearing elements comprise additional superhard contact elements on the first assembly and on the thrust support structure of the second assembly.

17. The bearing assembly of claim 15, wherein the one or more thrust bearing elements comprise a hardened surface formed on the first assembly and on the thrust support structure of the second assembly.

18. A method of providing a bearing assembly between components of a rotating system, the method comprising:
    rotating a shaft about an axis of rotation;
    supporting the rotating shaft with a first ring of the bearing assembly coupled to the shaft and a second ring of the bearing assembly coupled to another component, the first ring and the second ring each having one or more superhard contact elements coupled thereto; and at least partially containing the first ring within the second ring with one or more thrust bearing elements.

19. The method of claim 18, further comprising supporting a thrust force applied between the first ring and the second ring with the one or more thrust bearing elements comprising one or more additional superhard contact elements.

20. The method of claim 19, further comprising passing the thrust force through a first contact surface of the one or more additional superhard contact elements that is in contact with a second contact surface of the one or more additional superhard contact elements, the first contact surface and the second contact surface being positioned in a direction transverse to the axis of rotation.

* * * * *